(12) United States Patent
Kato

(10) Patent No.: US 11,404,734 B2
(45) Date of Patent: Aug. 2, 2022

(54) VEHICLE BATTERY PACK

(71) Applicant: Yazaki Corporation, Tokyo (JP)

(72) Inventor: Takuya Kato, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 217 days.

(21) Appl. No.: 17/014,045

(22) Filed: Sep. 8, 2020

(65) Prior Publication Data

US 2021/0075076 A1 Mar. 11, 2021

(30) Foreign Application Priority Data

Sep. 10, 2019 (JP) .............................. JP2019-164198

(51) Int. Cl.
| | |
|---|---|
| *H01M 10/6551* | (2014.01) |
| *H01M 10/613* | (2014.01) |
| *H01M 10/625* | (2014.01) |
| *H01M 10/659* | (2014.01) |
| *H01M 10/653* | (2014.01) |

(52) U.S. Cl.
CPC ..... *H01M 10/6551* (2015.04); *H01M 10/613* (2015.04); *H01M 10/625* (2015.04); *H01M 10/653* (2015.04); *H01M 10/659* (2015.04); *H01M 2220/20* (2013.01)

(58) Field of Classification Search
CPC ........... H01M 10/6551; H01M 10/613; H01M 10/625; H01M 10/653; H01M 10/659; H01M 2220/20; H01M 10/6557; H01M 10/6563; H01M 10/6567; H01M 10/617; H01M 10/643; Y02E 60/10
See application file for complete search history.

(56) References Cited

U.S. PATENT DOCUMENTS

| | | | | |
|---|---|---|---|---|
| 2012/0171523 | A1* | 7/2012 | Yang | H01M 10/653 |
| | | | | 429/50 |
| 2013/0189560 | A1* | 7/2013 | Widhalm | H01M 50/581 |
| | | | | 29/623.5 |
| 2014/0335382 | A1* | 11/2014 | Balandin | H01M 10/6554 |
| | | | | 252/73 |

(Continued)

FOREIGN PATENT DOCUMENTS

| | | | | |
|---|---|---|---|---|
| CN | 105552479 | A * | 5/2016 | |
| CN | 106058371 | A * | 10/2016 | ......... H01M 10/486 |

(Continued)

*Primary Examiner* — Kaity V Chandler
(74) *Attorney, Agent, or Firm* — Sughrue Mion, PLLC

(57) ABSTRACT

A vehicle battery pack includes: a battery cell; a casing that has a heat dissipation property for discharging heat outside the casing and houses the battery cell in a housing space; a first solid-liquid phase change material that directly comes in contact with the battery cell and fills the housing space; a second solid-liquid phase change material that has a heat storage property and has a second phase change temperature higher than a first phase change temperature of the first solid-liquid phase change material; and a heat storage container that has thermal conductivity and has an internal space filled with the second solid-liquid phase change material. The heat storage container is housed in the housing space of the casing, and has an outer wall surface that comes in contact with an inner wall surface of the casing.

12 Claims, 7 Drawing Sheets

(56) References Cited

U.S. PATENT DOCUMENTS

| | | | | |
|---|---|---|---|---|
| 2015/0037648 A1* | 2/2015 | Nguyen | ............... | H01M 10/613 |
| | | | | 429/120 |
| 2015/0037662 A1* | 2/2015 | Pinon | .................. | H01M 50/548 |
| | | | | 29/623.2 |
| 2016/0006088 A1* | 1/2016 | Boetcher | ................. | F28D 20/02 |
| | | | | 165/80.2 |
| 2016/0190652 A1* | 6/2016 | Wang | ................ | H01M 10/4264 |
| | | | | 320/128 |
| 2018/0358671 A1* | 12/2018 | Halsey | ................ | H01M 10/625 |
| 2019/0252743 A1* | 8/2019 | Liu | .................... | H01M 10/6551 |
| 2019/0393576 A1* | 12/2019 | Sunada | ............. | H01M 10/6554 |
| 2020/0067152 A1* | 2/2020 | Jeon | .................... | H01M 10/625 |

FOREIGN PATENT DOCUMENTS

| | | | | | |
|---|---|---|---|---|---|
| CN | 107591588 A | * | 1/2018 | | |
| CN | 107681224 A | * | 2/2018 | .......... | H01M 10/613 |
| CN | 208271994 U | * | 12/2018 | | |
| CN | 209389176 U | * | 9/2019 | | |
| CN | 110690531 A | * | 1/2020 | | |
| CN | 111106411 A | * | 5/2020 | .......... | H01M 10/613 |
| CN | 111384463 A | * | 7/2020 | .......... | H01M 10/613 |
| FR | 3063340 A1 | * | 8/2018 | ............. | F28D 20/02 |
| JP | 2018-037157 A | | 3/2018 | | |
| JP | 2018-037159 A | | 3/2018 | | |
| JP | 6650472 B2 | * | 2/2020 | .......... | H01M 10/613 |
| JP | 2020-170584 A | | 10/2020 | | |
| KR | 101748645 B1 | * | 6/2017 | | |
| WO | 2011/084728 A1 | | 7/2011 | | |

\* cited by examiner

VEHICLE BATTERY PACK

CROSS-REFERENCE TO RELATED APPLICATION(S)

The present application claims priority to and incorporates by reference the entire contents of Japanese Patent Application No. 2019-164198 filed in Japan on Sep. 10, 2019.

BACKGROUND OF THE INVENTION

1. Field of the Invention

The present invention relates to a vehicle battery pack.

2. Description of the Related Art

On vehicles such as electric vehicles (EV), hybrid electric vehicles (HEV), and plug-in hybrid electric vehicles (PHEV), a vehicle battery pack, for example, is mounted as a power source for supplying the power to drive a motor as a driving source. A plurality of battery cells (secondary batteries) are housed in the vehicle battery pack, and the battery cells are electrically connected to each other in series and/or in parallel. In order to avoid variations is the temperatures of the battery cells placed closely or to promote cooling thereof, a solid-liquid phase change material is disposed in the periphery of the battery cells so that the temperatures can be kept uniform due to heat absorption by the latent heat of the solid-liquid phase change material and temperature increase can be suppressed due to convection cooling at the time of liquefaction (for example, see Japanese Patent Application Laid-open No. 2018-37159). There is also a technique with which, one side of a thermal conductive member the other side of which comes in contact with battery cells is designed to come in contact with at least one of a solid-liquid phase change material and a heat dissipation surface of a casing so as to transfer the heat of the battery cells for cooling (for example, see Japanese Patent Application Laid-open No. 2018-37157).

By the way, conventional vehicle battery packs are fine if the solid-liquid phase change material can fully absorb the heat generated by the battery cells. However, it is concerned that the temperature of the solid-liquid phase change material liquefied in the vicinity of the battery cells may exceed the battery upper limit temperature of the battery cells when the amount of heat generated by the battery cells exceeds the melting amount of the solid-liquid phase change material, so that there is still a room for improvement.

SUMMARY OF THE INVENTION

It is an object of the present invention to provide a vehicle battery pack capable of effectively cooling battery cells.

In order to achieve the above mentioned object, a vehicle battery pack according to one aspect of the present invention includes at least one battery cell; a casing that has a heat dissipation property for discharging heat outside the casing and houses the battery cell in a housing space; a first solid-liquid phase change material that directly comes in contact with the battery cell and fills the housing space; a second solid-liquid phase change material that has a heat storage property and has a second phase change temperature higher than a first phase change temperature of the first solid-liquid phase change material; and a heat storage container that has thermal conductivity and has an internal space filled with the second solid-liquid phase change material, wherein the heat storage container is housed in the housing space of the casing, and has an outer wall surface that comes in contact with an inner wall surface of the casing.

According to another aspect of the present invention, in the vehicle battery pack, it is possible to further include that a thermal conductive member including a contact part that comes in contact with at least an outer surface of the battery cell, wherein the thermal conductive member has an extended part extended from the contact part toward a vertical direction, the extended part coming in contact with the inner wall surface of the casing.

According to still another aspect of the present invention, in the vehicle battery pack, it is possible to further include that a thermal conductive member including a contact part that comes in contact with at least an outer surface of the battery cell, wherein the thermal conductive member has an extended part extended from the contact part toward a vertical direction, the extended part coming in contact with the outer wall surface of the heat storage container.

According to still another aspect of the present invention, in the vehicle battery pack, it is possible to configure that the heat storage container comes in surface contact with, in the inner wail surface of the casing, at least one of an inner top face and an inner bottom face opposing to each other in a vertical direction.

According to still another aspect of the present invention, in the vehicle battery pack, it is possible to configure that the first phase change temperature of the first solid-liquid phase change material and the second phase change temperature of the second solid-liquid phase change material have the following relations: the first phase change temperature < a set outside temperature; and the second phase change temperature > the set outside temperature.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS is a plan view illustrating a schematic configuration of a vehicle battery pack according to a first embodiment;

DETAILED DESCRIPTION OF THE PREFERRED EMBODIMENTS

Hereinafter, embodiments of a vehicle battery pack according to the present, invention will be described in detail by referring to the accompanying drawings. Note, however, that the present invention is not limited to the embodiments illustrated hereinafter. Further, it is to be noted that structural elements in the following embodiments include elements that, can be easily replaced by those skilled in the art or elements considered substantially the same. Furthermore, various kinds of omissions, substitutions, and modifications of the structural elements of the following embodiments are possible without departing from the scope of the present invention.

First Embodiment

Figure 1:
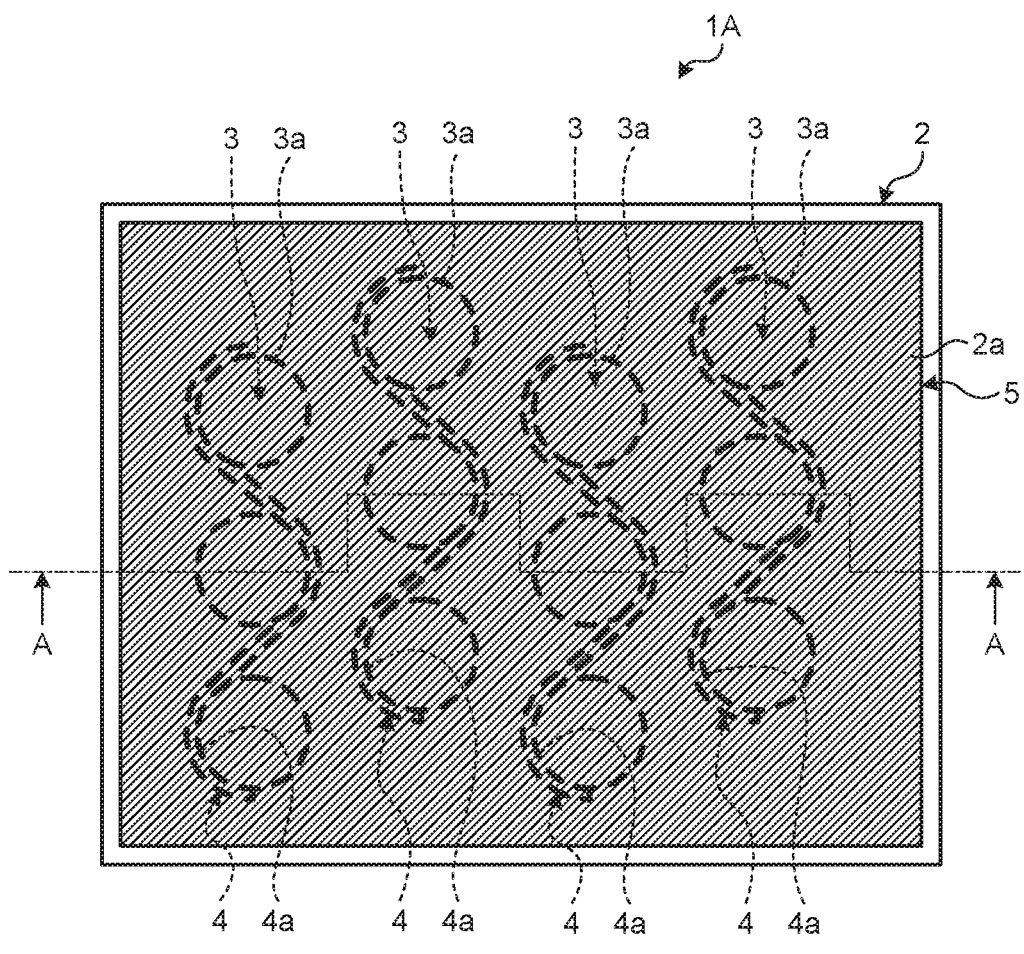
Figure 2:
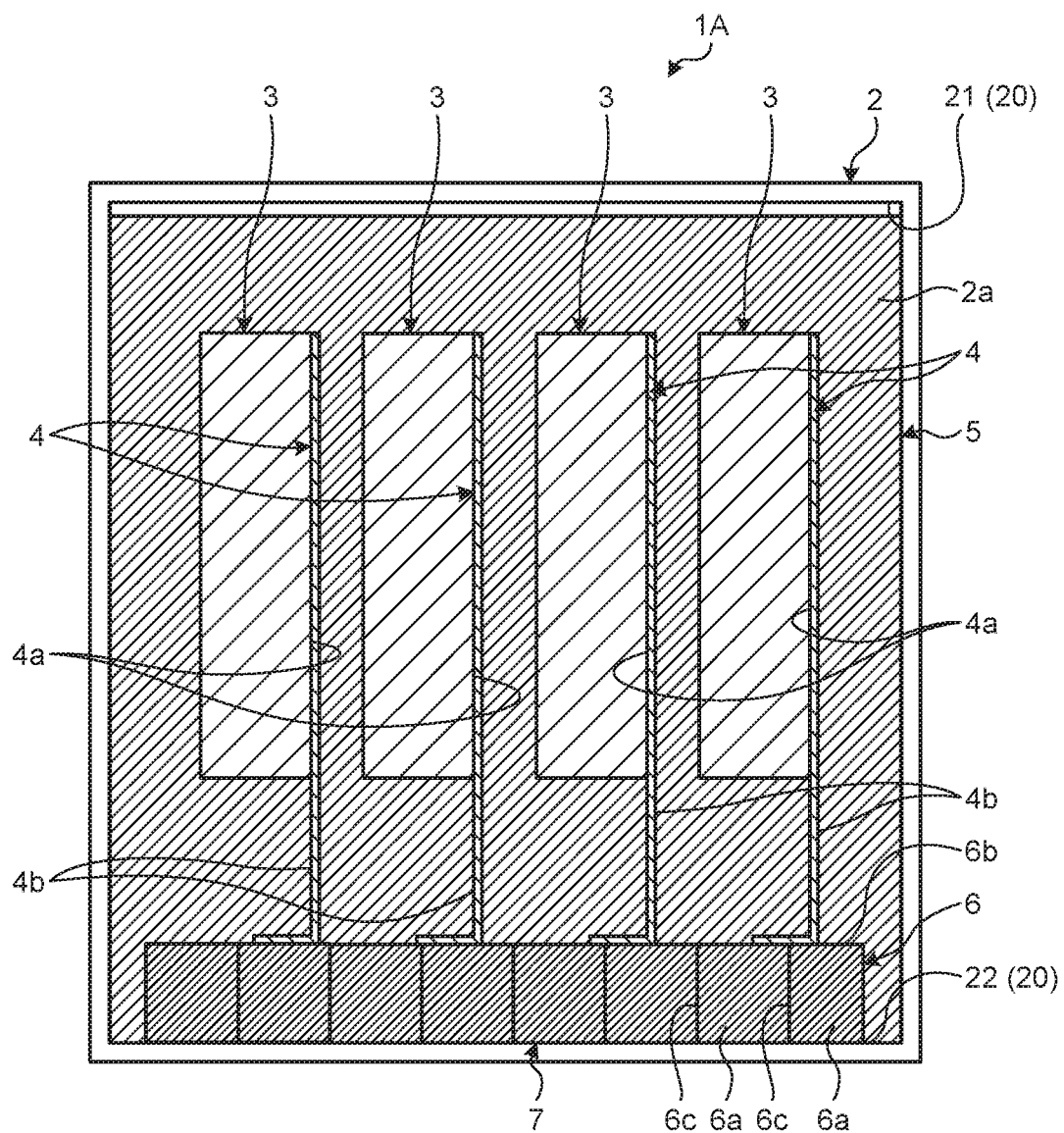
FIG. 2 is a longitudinal sectional view illustrating a schematic configuration of the vehicle battery pack according to the first embodiment.
Figure 3:
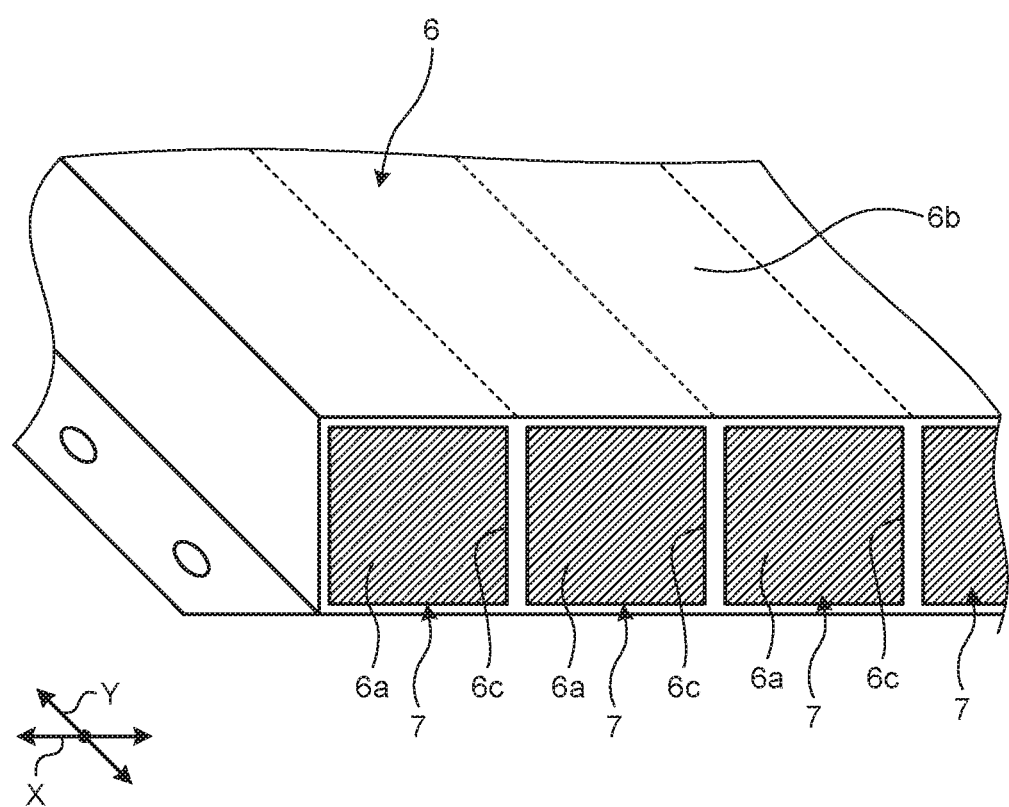
FIG. 3 is a sectional perspective view illustrating a schematic configuration of a heat storage container in the vehicle battery pack according to the first embodiment.
Figure 4:
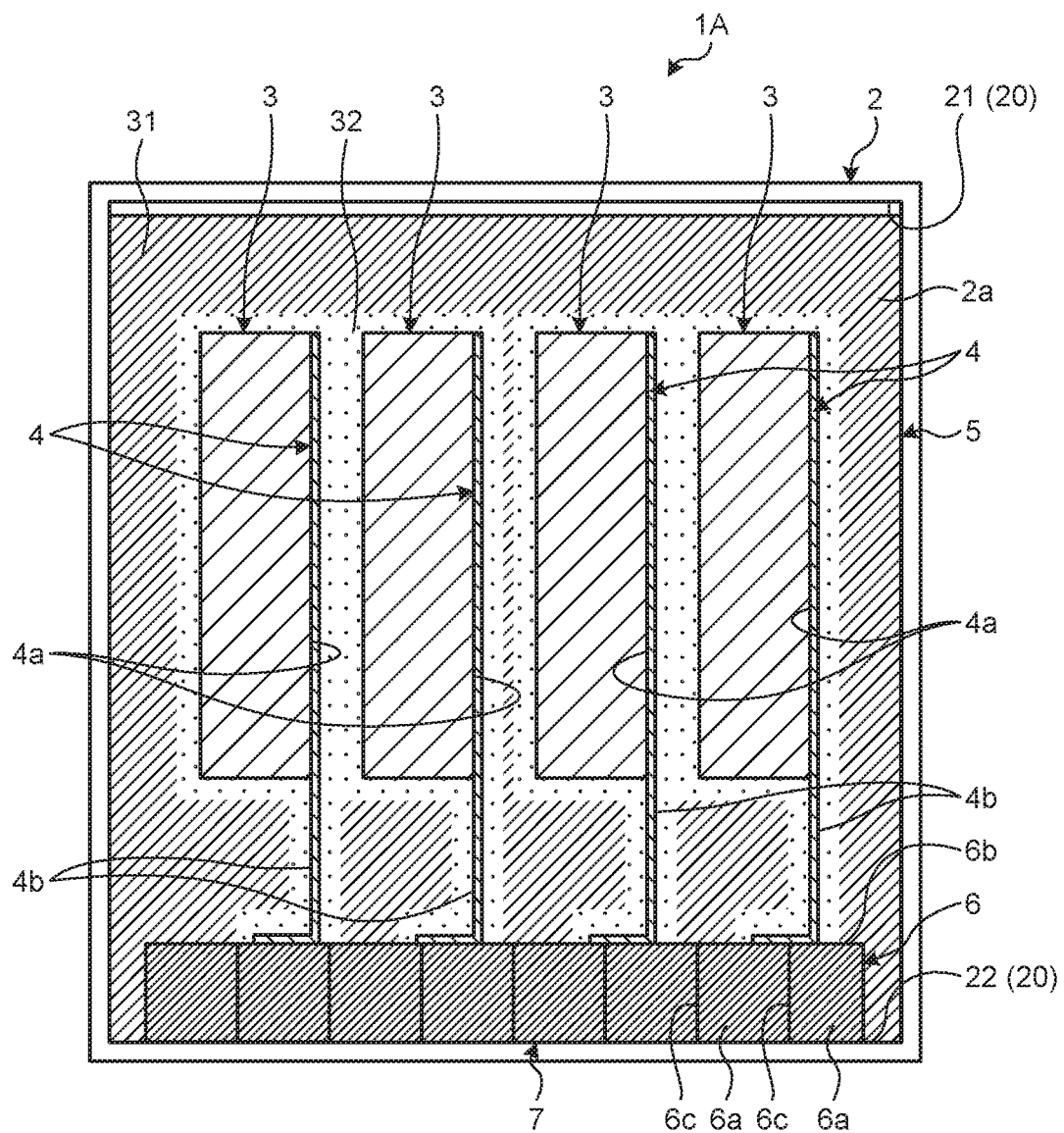
FIG. 4 is a longitudinal sectional view illustrating a state where heat is generated in battery cells of the vehicle battery pack according to the first embodiment.
Figure 5:
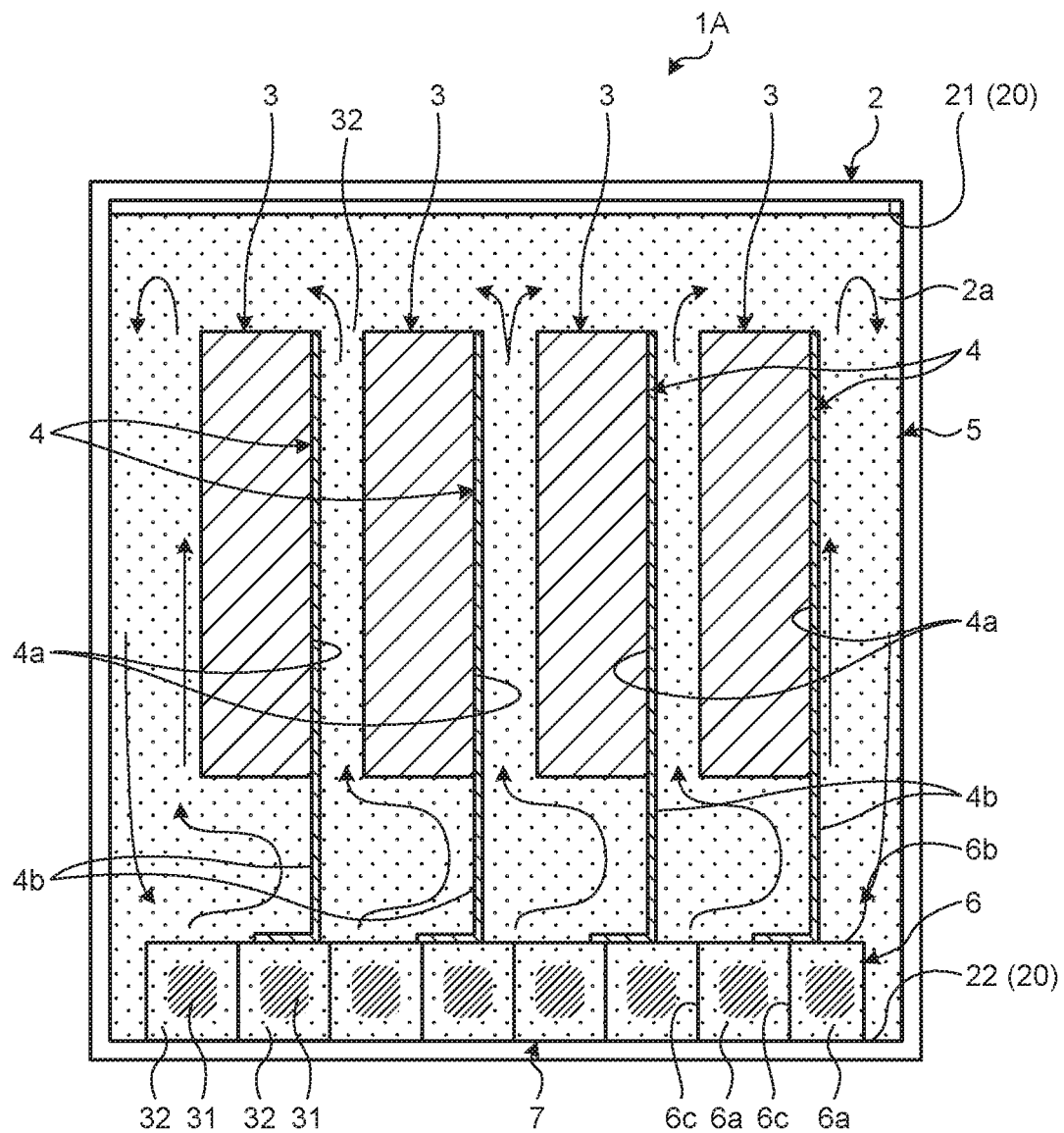
FIG. 5 is a longitudinal sectional view illustrating another state where heat is generated in the battery cells of the vehicle battery pack according to the first embodiment.
Figure 5:
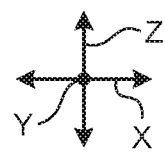
Figure 6:
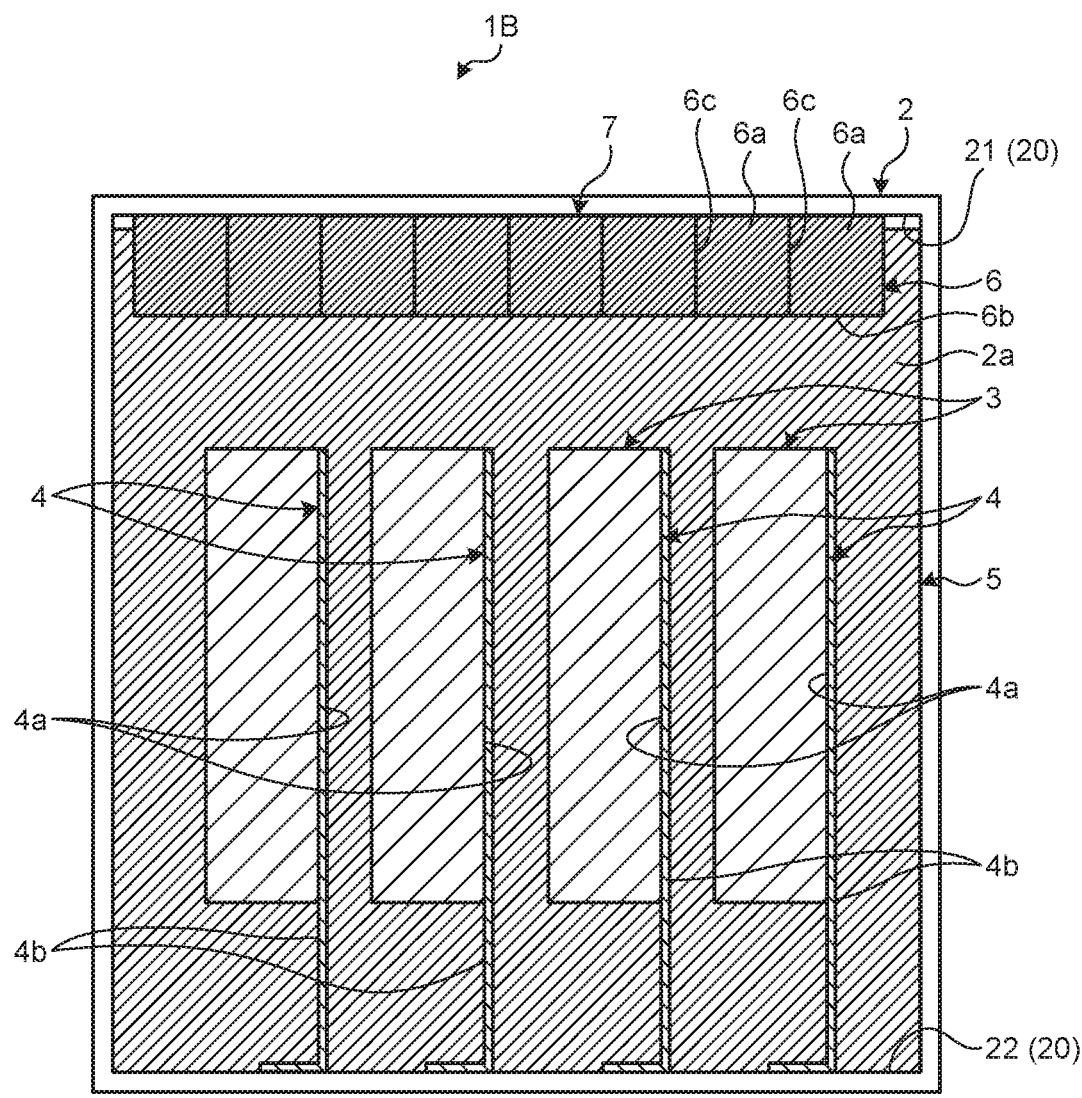
FIG. 6 is a plan view illustrating a schematic configuration of a vehicle battery pack according to a second embodiment.
Figure 7A:
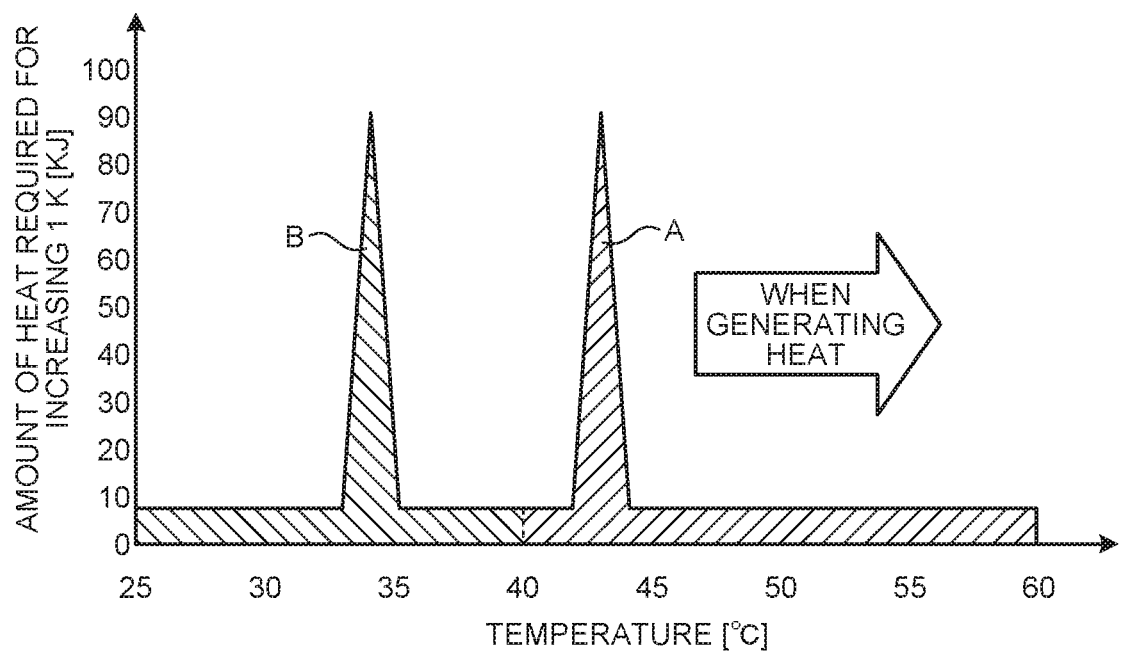
FIG. 7A is a graph illustrating the amount of heat required when heat is generated in the battery cells in a case of using two kinds of solid-liquid phase change materials.
Figure 7B:
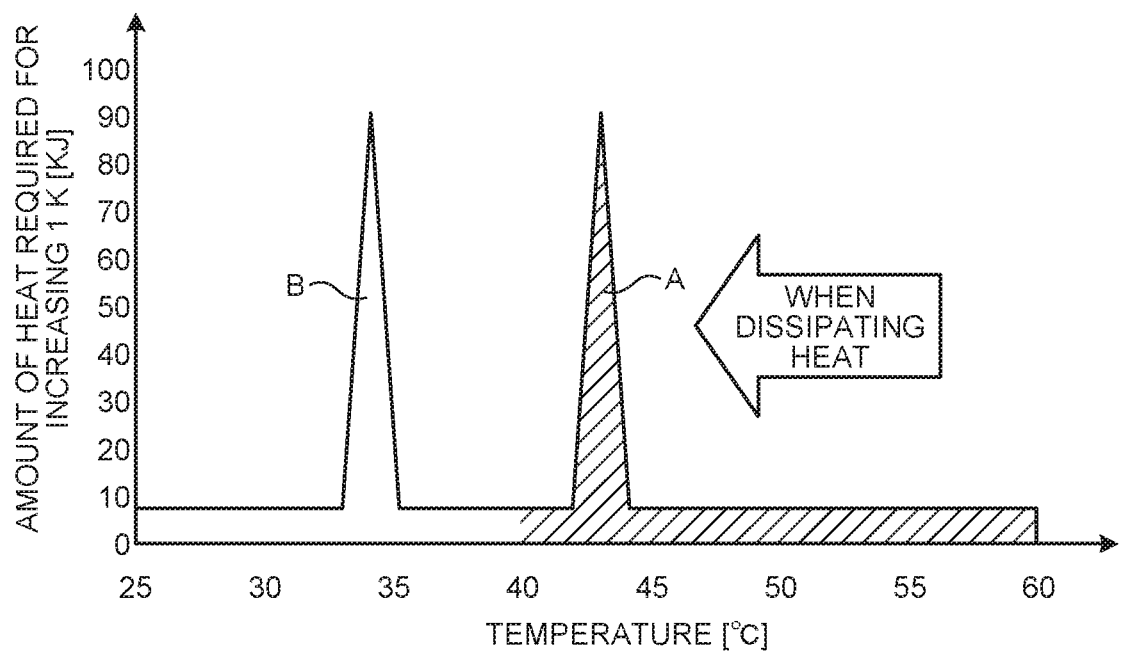
FIG. 7B is a graph illustrating the amount of heat required when dissipating the heat of the battery cells in a case of using the two kinds of solid-liquid phase change materials.

First, the vehicle battery pack according to the first embodiment will be described. FIG. 1 is a plan view illustrating a schematic configuration of the vehicle battery pack according to the first embodiment. FIG. 2 is a longitudinal sectional view illustrating a schematic configuration of the vehicle battery pack according to the first embodiment. FIG. 3 is a sectional perspective view illustrating a schematic configuration of a heat storage container in the vehicle battery pack according to the first embodiment. FIG. 4 is a longitudinal sectional view illustrating a state where heat is generated in battery cells of the vehicle battery pack according to the first embodiment. FIG. 5 is a longitudinal sectional view illustrating another state where heat is generated in the battery cells of the vehicle battery pack according to the first embodiment. FIG. 7A is a graph illustrating the amount of heat required when heat is generated in the battery cells in a case of using two kinds of solid-liquid phase change materials, and FIG. 7B is a graph illustrating the amount of heat required when dissipating the heat of the battery cells in a case of using the two kinds of solid-liquid phase change materials. Note that FIG. 1 is a diagram illustrating a state where a lid, not illustrated, of a casing is removed and inside thereof is exposed on the outer side. FIG. 2, FIG. 4, and FIG. 5 (including FIG. 6) are sectional views taken along A-A of FIG. 1. In FIG. 7 the vertical axis is the amount of heat (kJ), and the horizontal axis is the temperature (° C.).

In the following description, X-direction in the drawings is the width direction of the vehicle battery pack of the embodiments. Y-direction is the depth direction of the vehicle battery pack of the embodiments, which is a direction orthogonal to the width direction. Z-direction is a top-and-bottom direction of the vehicle battery pack of the embodiments, which is the direction orthogonal to the width direction and the depth direction. Further, the vehicle battery pack of the embodiments is placed in a vehicle internal space with its top-and-bottom direction being aligned with the vertical direction. Each of the directions used in the following description will be mentioned as the direction under a state where each component is assembled mutually and the vehicle battery pack is mounted on a vehicle unless otherwise noted.

A vehicle battery pack 1A according to the embodiment is mounted on a vehicle, not illustrated, specifically on a vehicle using a motor as a driving source, such as an electric vehicle (EV), a hybrid electric vehicle (HEV), or a plug-in hybrid electric vehicle (PHEV), to be a power source for supplying the power to the driving source. As illustrated in and FIG. 2, the vehicle battery pack 1A is configured including a casing 2, a plurality of battery cells 3, a thermal conductive member 4, a first solid-liquid phase change material 5, a heat storage container 6, and a second solid-liquid phase change material 7.

The casing 2 has a housing space 2a, and the housing space 2a is closed by a lid, not illustrated. The battery cells 3, the thermal conductive member 4, the first solid-liquid phase change material 5, and the heat storage container 6 are housed in the housing space 2a. Considering that the internal pressure inside the casing is increased at the time of solid-liquid change of the first solid-liquid phase change material 5 or due to thermal expansion or the like of the first solid-liquid phase change material 5, the housing space 2a has an air layer capable of easily absorbing the pressure. The casing 2 has a heat dissipation property for releasing the heat outside the casing 2, and is provided at a place where an outer wall surface thereof can come in contact with the fresh air captured from the outside of the vehicle. The casing 2 is formed with a metallic material such as iron, copper, or aluminum, for example. In a case where a waterproof property is required for the vehicle battery pack 1A, a waterproof structure is formed between the casing 2 and the lid to tightly close the housing space 2a.

Each of the battery cells 3 is a chargeable/dischargeable secondary battery, and arranged in the housing space 2a of the casing 2 to be held in the casing 2. Each of the battery cells 3 of the embodiment is configured with a cylindrical lithium ion battery extended in the vertical direction. As illustrated in FIG. 1, the battery cells 3 are arranged in a houndstooth check form in the width direction or the depth direction within the housing space 2a of the casing 2.

The thermal conductive member 4 has thermal conductivity, which receives the heat generated by each of the battery cells 3 and transmits the heat to the heat storage container 6. The thermal conductive member 4 is formed with, for example, graphite, a resin material containing a thermal conductive filler, or a metallic material such as copper or aluminum. As illustrated in FIG. 1, the thermal conductive member 4 is formed in a wavelike form along an outer surface 3a of each of the battery cells 3 arranged in the width direction, for example, when viewed from the vertical direction. When the battery cells 3 are neighboring to each other in the depth direction, the thermal conductive member 4 is formed by being sandwiched between the neighboring battery cells 3. As illustrated in FIG. 2, the thermal conductive member 4 includes a contact part 4a that comes in contact with the outer surface 3a of the battery cell 3, and an extended part 4b that is extended from the contact part 4a toward the vertical direction. The contact part 4a is extended along the top-and-bottom direction of each of the battery cells 3. The extended part 4b comes in contact with an outer wall surface 6b of the heat storage container 6. The end portion of the extended part 4b in the vertical direction is in an L-letter shape, and the face of the end portion facing toward the vertical direction comes in surface contact with the outer wall surface 6b of the heat storage container 6.

The first solid-liquid phase change material 5 directly comes in contact with the battery cells 3 and fills the housing space 2a of the casing 2. When, for example, the vehicle is stationary, the amount of the first solid-liquid phase change material 5 filling the housing space 2a is sufficient for covering at least the whole surface of each of the battery cells 3. The first solid-liquid phase change material 5 has thermal conductivity and a heat storage property, which stores the heat (heat storage) when a substance changes its phase from solid to liquid (melting), and discharges the heat (heat dissipation) when the substance changes its phase from liquid to solid (solidification). Examples of the first solid-liquid phase change material 5 may be oil such as silicone oil, a fluorine-based liquid, paraffin, and a microcapsule slurry. The first solid-liquid phase change material 5 is preferable to be a material that is nonconductive and hard to volatilize. The first solid-liquid phase change material 5 of the embodiment maintains a solid state under a normal temperature, and has a phase change temperature (melting point, for example) at which the phase changes from the solid state to a liquid state before the battery cells 3 reach the upper limit temperature set for the battery cells 3. The upper limit temperature of the battery cells 3 is 60° C., for example. Assuming that the phase change temperature of the first solid-liquid phase change material 5 of the embodiment is a first phase change temperature, the first phase change temperature is 35° C., for example. Note that "35° C." is the temperature at which the vehicle battery pack 1A mounted on the vehicle is not naturally liquefied in summer of Japan as well as various countries where the vehicle on which the vehicle battery pack 1A is mounted travels, for example.

The heat storage container 6 has thermal conductivity and has an internal space 6a filled with a second solid-liquid phase change material 7. The heat storage container 6 is housed in the housing space 2a of the casing 2, and the outer wall surface 6b comes in contact with an inner wall surface 20 of the casing 2. The heat storage container 6 of the embodiment is disposed on the lower side of the top-and-bottom direction of the battery cells 3, and the outer wall surface 6b comes in surface contact with an inner bottom face 22 of the casing 2. The heat storage container 6 is formed with a metallic material such as iron, copper, or aluminum, for example. The heat storage container 6 is formed by processing an extruded metallic material, for example.

As illustrated in FIG. 3, in the heat storage container 6, the internal space 6a is divided into small spaces by a plurality of inner walls 6c. A plurality of the small spaces are arranged along the width direction. Each of the small spaces is formed in a rectangular shape when viewed from the depth direction with a pair of inner wall surfaces opposing to each other in the top-and-bottom direction and a pair of inner wall faces opposing to each other in the width direction. Further, each of the small spaces is formed in a cuboid shape with a pair of inner wall faces opposing to each other in the top-and-bottom direction, a pair of inner wall faces opposing to each other in the width direction, and a pair of inner wall faces opposing to each other in the depth direction. The space between inner walls 6c in the width direction is set to have heat resistance with which the second solid-liquid phase change material 7 can be fully cooled even into the inside thereof within an extremely short time by considering the thermal conductivity of the second solid-liquid phase change material 7. For example, assuming that the thermal conductivity of the second solid-liquid phase change material 7 is P and the space between the inner walls 6c in the width direction is Q, the space U between the inner walls 6c in the width direction is U>Q when the thermal conductivity R of the second solid-liquid phase change material 7 is R>P.

The second solid-liquid phase change material 7 fills the internal spaces 6a of the heat storage container 6. Preferably, the second solid-liquid phase change material 7 is enclosed in the internal spaces 6a of the heat storage container 6. The second solid-liquid phase change material 7 is enclosed in the heat storage container 6 such as to be isolated from the housing space 2a of the casing 2 and not to be mixed with the first solid-liquid phase change material 5. Like the first solid-liquid phase change material 5, the second solid-liquid phase change material 7 has thermal conductivity and a heat storage property, which stores the heat (heat storage) when a substance changes its phase from solid to liquid (melting), and discharges the heat (heat dissipation) when the substance changes its phase from liquid to solid (solidification). Examples of the second solid-liquid phase change material 7 may be oil such as silicone oil, a fluorine-based liquid, paraffin, a microcapsule slurry, water, vanadium dioxide, ethylene glycol, sodium thionitrate, sodium hydrogen phosphate, and sodium nitrate. The second solid-liquid phase change material 7 may be conductive but preferable to be a material that is hard to volatilize. The second solid-liquid phase change material 7 of the embodiment maintains a solid state under a normal temperature, and has a phase change temperature (melting point, for example) at which the phase changes from the solid state to the liquid state before the battery cells 3 reach the upper limit temperature set for the battery cells 3. The second solid-liquid phase change material 7 has a phase change temperature (second phase change temperature) that is higher than the first phase change temperature of the first solid-liquid phase change material 5. The second phase change temperature is 50° C., for example. Note that "50° C." is the value at which the vehicle battery pack 1A mounted on the vehicle is not naturally liquefied in the countries where the outside temperatures are the highest among the countries where the vehicle on which the vehicle battery pack 1A is mounted travels, for example.

Next, heat conduction in the vehicle battery pack 1A according to the embodiment will be described.

The heat generated in each of the battery cells 3 is transmitted to the first solid-liquid phase change material 5 from the outer surface of each of the battery cells 3, and also transmitted to the thermal conductive member 4 via the contact part 4a from the outer surface 3a. The first solid-liquid phase change material 5 in the periphery of each of the battery cells 3 changes its phase from solid to liquid in accordance with a temperature increase in each of the battery cells 3 (FIG. 4). In this case, for example, the first solid-liquid phase change material 5 is configured with a solidified area 31 in a solid state and a liquefied area 32 that is phase-changed to be in a liquid state. The heat transmitted to the thermal conductive member 4 is transmitted to the heat storage container 6 via the extended part 4b and transmitted to the second solid-liquid phase change material 7 on the inner side, while changing the phase of the first solid-liquid phase change material 5 in the periphery of the thermal conductive member 4 from solid to liquid.

The first solid-liquid phase change material 5 changes its phase gradually from the periphery of each of the battery cells 3 and the periphery of the thermal conductive member 4, and finally makes transition from solid to liquid as a whole. In the embodiment, the first phase change temperature of the first solid-liquid phase change material 5 is set to be lower than the upper limit temperature of the battery cells 3, so that the entire first solid-liquid phase change material 5 changes its phase to liquid before the battery cells 3 reach the upper limit temperature. Convection of the entirely liquefied first solid-liquid phase change material 5 occurs in accordance with a temperature increase in the battery cells 3 and the heat of the battery cells 3 is transmitted to the inner wall surface 20 of the casing 2 and the heat storage container 6 by the convection. The heat transmitted to the inner wall surface 20 of the casing 2 is dissipated from the outer surface of the casing 2. Meanwhile, a part of the heat transmitted to the heat storage container 6 is dissipated from the outer surface of the casing 2 via the inner bottom face 22 of the casing 2, while the remainder is stored in the second solid-liquid phase change material 7 inside the heat storage container 6. In the manner described above, the entirely liquefied first solid-liquid phase change material 5 is cooled by the inner wall surface 20 of the casing 2 and the heat storage container 6. When storage of the heat proceeds, the second solid-liquid phase change material 7 changes its phase at the second phase change temperature that is higher than the first phase change temperature and absorbs the heat transmitted to the heat storage container 6, thereby cooling the liquefied first solid-liquid phase change material 5.

In the embodiment, the heat can be transmitted from the battery cell 3 to the heat storage container 6 via the thermal conductive member 4, so that it is possible to ease the temperature increase in the battery cell 3 even when the phase of the first solid-liquid phase change material is being changed. Further, since the part where the thermal conductive member 4 comes in contact with the first solid-liquid phase change material 5 can be considered as the surface area of the battery cell 3, the thermal conductivity from the battery cell 3 to the first solid-liquid phase change material 5 can be increased.

In the embodiment, the first phase change temperature of the first solid-liquid phase change material and the second phase change temperature of the second solid-liquid phase change material have the following relations: the first phase change temperature < the second phase change temperature; the first phase change temperature < the set outside temperature; and the second phase change temperature > the set outside temperature. Note here that the set outside temperature is −40° C. to 50° C., for example, by considering the use environment of the vehicle, and preferable to be −40° C. to 40° C. The second phase change temperature is preferable to be higher than the highest temperature in the use environment of the vehicles (roughly for each country), and the set temperature is preferable to be set to the highest temperature in the use environment.

As for the vehicle battery pack 1A described above, the first solid-liquid phase change material 5 has the first phase change temperature lower than that of the second solid-liquid phase change material 7, directly comes in contact with the battery cells 3, and fills the housing space 2a. This makes it possible to temporarily suppress the temperature increase in the battery cells 3 by absorption of the heat by the phase change of the first solid-liquid phase change material 5 caused by the temperature increase in the battery cells 3. The second solid-liquid phase change material 7 fills the internal space 6a of the heat storage container 6, and is housed in the housing space 2a of the casing 2. Thereby, the heat of the battery cells 3 is transferred to the heat storage container 6 due to the convection of the phase-changed and liquefied first solid-liquid phase change material 5, and the temperature increase of the first solid-liquid phase change material 5 can be suppressed by absorption of the heat by the phase change of the second solid-liquid phase change material 7 within the heat storage container 6. As for the heat storage container 6, the outer wall surface 6b comes in contact with the inner bottom face 22 of the casing 2. Thereby, the heat transferred to the heat storage container 6 and the second solid-liquid phase change material 7 is discharged outside the casing 2 via the inner wall surface 20 of the casing 2, so that the temperature increase of the heat storage container 6 and the second solid-liquid phase change material 7 can be suppressed.

Further, even when the temperature of the battery cells 3 reaches 60° C. and the first solid-liquid phase change material 5 and the second solid-liquid phase change material 7 turn to liquid, the second solid-liquid phase change material 7 having the high phase change temperature immediately starts to solidify and release the stored heat, and the battery cells 3 protected by the first solid-liquid phase change material 5 can also release the heat from the inner wall surface 20 of the casing 2 via the thermal conductive member 4. With such two actions, it is possible to lower the temperature of the battery cells 3 before the start of next operation and also to ease the temperature increase in the battery cells 3 after the start of operation by the phase change of the solidified second solid-liquid phase change material 7.

Further, in the vehicle battery pack 1A, the thermal conductive member 4 is extended toward the vertical direction from the contact part 4a and comes in contact with the outer wall surface 6b of the heat storage container 6. Thereby, the heat transmitted from the battery cell 3 to the thermal conductive member 4 is transmitted to the heat storage container 6 and stored in the second solid-liquid phase change material 7 on the inside, and also transmitted to the casing 2 via the heat storage container 6 and dissipated from the outer surface of the casing 2. As a result, the heat generated in each of the battery cells can be securely cooled.

Further, in the vehicle battery pack 1A, the heat storage container 6 comes in surface contact with the inner bottom face 22 in the inner wall surface 20 of the casing 2. This makes it possible to securely transfer the heat transmitted to the heat storage container 6 and the heat stored in the second solid-liquid phase change material 7 on the inside to the inner bottom face 22, so that the cooling efficiency can be improved.

Further, in the vehicle battery pack 1A, the internal space 6a of the heat storage container 6 is divided into small spaces by the inner walls 6c. Thereby, the surface area can be increased by dividing the second solid-liquid phase change material 7, so that it is possible to uniformly transmit the heat received by the heat storage container 6 to the divided second solid-liquid phase change material 7 via the inner walls 6c.

Further, in the vehicle battery pack 1A, the first phase change temperature of the first solid-liquid phase change material 5 and the second phase change temperature of the second solid-liquid phase change material 7 have the relations satisfying the first phase change temperature < the second phase change temperature, the first phase change temperature < the set outside temperature, and the second phase change temperature > the set outside temperature. Means for releasing the heat stored in the first solid-liquid phase change material 5 and the second solid-liquid phase change material 7 is dissipation of the heat to the outside air. However, when the outside temperature is higher than the phase change temperature, the heat of the two solid-liquid phase change materials is not released and the battery cells 3 cannot be used at the start of next operation since the heat is normally transferred only from higher temperatures to lower temperatures. However, it does not simply mean to increase the phase change temperatures of the two solid-liquid phase change materials. For example, if the first phase change temperature and the second phase change temperature are 50° C., melting starts from the first solid-liquid phase change material 5 so that the temperature of the batteries happen to reach 60° C. while the first solid-liquid phase change material 5 is being melted without having the effect of heat equalization and convection cooling. Further, since it is a characteristic of the heat to be transferred faster as the temperature difference is greater, the heat stored in the second solid-liquid phase change material 7 can be released in a relatively short time at night where normally the outside temperature is not high so that there is a greater temperature difference with respect to the outside temperature. For example, if the outside temperature is 25° C., the amount of heat from 25° C. to 60° C. (integrated by 1 K, see hatched areas A and B in FIG. 7A) can be stored for bringing the battery temperature up to 60° C. However, the outside temperature is 40° C., stored is only the amount of heat from 40° C. to 60° C. (the area A in FIG. 7A). When the batteries are not in use, it is desired to release the stored heat to prepare for the next use of the batteries. However, it is possible to store the amount of heat of the area A illustrated in FIG. 7B even when the outside temperature is higher (40° C., for example) than the first phase change temperature of the first solid-liquid phase change material 5. Therefore, in the embodiment, the first phase change temperature of the first solid-liquid phase change material 5 and the second phase change temperature of the second solid-liquid phase change material 7 have the relations satisfying the first phase change temperature < the second phase change temperature, the first phase change temperature < the set outside temperature, and the second phase change temperature > the set outside temperature.

Second Embodiment

Next, a vehicle battery pack according to the second embodiment will be described. FIG. 6 is a plan view illustrating a schematic configuration of the vehicle battery pack according to the second embodiment. A vehicle battery pack 1B according to the second embodiment is different from the above-described vehicle battery pack 1A in respect that the heat storage container 6 is disposed on an upper side of the battery cells 3 in the top-and-bottom direction and that the outer wall surface 6b comes in contact with an inner top face 21 in the inner wall surface 20 of the casing 2. In the following description, duplicated explanations of the configurations, actions, and effects that are in common to those of the first embodiment described above are avoided as much as possible.

As for the thermal conductive member 4 of the embodiment, the extended part 4b comes in contact with the inner bottom face 22 of the casing 2. The face of the L-letter-shaped end portion of the extended part 4b facing the vertical direction comes in surface contact with the inner bottom face 22 of the casing 2.

The heat storage container 6 of the embodiment is disposed on the upper side of the vertical direction of the battery cells 3, and the outer wall surface 6b comes in surface contact with the inner top face 21 of the casing 2.

In the above-described vehicle battery pack 1B, the heat storage container 6 is disposed on the upper side of the vertical direction of the battery cells 3 and the outer wall surface 6b comes in surface contact with the inner top face 21 of the casing 2, so that it is possible to acquire the effects similar to those of the vehicle battery pack 1A. In the vehicle battery pack 1B, the heat storage container 6 is disposed on the upper side of the battery cells 3 so that the first solid-liquid phase change material 5 raised by being warmed by the battery cells 3 comes in contact with the heat storage container 6 to transfer the heat and then cooled and lowered to promote the convection of the first solid-liquid phase change material 5 still more. Further, when there is a large mass change in the first solid-liquid phase change material 5 due to the phase change or volume expansion, the housing space 2a cannot be filled with the first solid-liquid phase change material 5 and a space (air layer) for absorbing the volume change is required on the upper side of the vertical direction. The air layer is normally a heat insulation layer. With the presence of this space, the first solid-liquid phase change material 5 cannot transmit the heat to the inner top face of the casing 2 so that the inner top face 21 of the inner wall surface 20 of the casing 2 cannot exert a cooling function. Thus, by disposing the heat storage container 6 such as to come in contact with the inner top face 21 of the casing 2, the inner top face 21 can receive the heat from the first solid-liquid phase change material 5 by excluding the air layer. Further, it becomes possible to transmit the heat to the battery cells 3 from the heat storage container 6, so that the cooling efficiency can be increased by about 1.5 times.

Further, in the vehicle battery pack 1B, the thermal conductive member 4 is extended toward the vertical direction from the contact part 4a and comes in contact with the inner bottom face 22 of the casing 2. Thereby, the heat transmitted to the thermal conductive member 4 from the battery cell 3 is transmitted to the casing 2 and dissipated from the outer surface of the casing 2, so that the heat generated in each of the battery cells 3 can be securely cooled.

Further, in the vehicle battery pack 1B, the heat storage container 6 comes in surface contact with the inner top face 21 in the inner wall surface 20 of the casing 2. This makes it possible to securely transfer the heat transmitted to the heat storage container 6 and the heat stored in the second solid-liquid phase change material 7 on the inside to the inner top face 21, so that the cooling efficiency can be improved.

Not limited to the first and second embodiments where the vehicle battery packs 1A and 1B are configured including the thermal conductive members 4, it is also possible to employ a configuration without the thermal conductive members 4.

While the thermal conductive members 4 in the first and second embodiments are disposed to weave through the battery cells 3 arranged in a houndstooth check form while coming in contact with the outer surfaces 3a as illustrated in FIG. 1, the configuration is not limited thereto.

Further, while the extended part 4b of the thermal conductive member 4 is described to have the L-letter shaped end portion in the first and second embodiments, the end portion may be any shapes as long as it comes in contact with the outer wall surface 6b of the heat storage container 6 or the inner wall surface 20 of the casing 2. Further, it is also possible to employ a configuration in which an erected part (not illustrated) standing in the vertical direction from the outer wall surface 6b of the heat storage container 6 or from the inner bottom face 22 of the casing 2 is provided, and the erected part and the extended part 4b come in contact with each other such by being superimposed in the width direction.

While the first solid-liquid phase change material 5 in the first and second embodiments is described to be a material the phase of which changes from solid to liquid, the material thereof is not limited thereto but may be a material the phase of which does not change from solid to liquid, such as a heat storage material having liquidity, thermal conductivity, and a heat storage property.

Further, while the second solid-liquid phase change material 7 in the first and second embodiments is described to be a material the phase of which changes from solid to liquid, the material thereof is not limited thereto but may be a material the phase of which does not change from solid to liquid, such as a vanadium oxide or a vanadium analogous compound, for example.

Further, while the face in the outer wall surface 6b of the heat storage container 6 coming in contact with the first solid-liquid phase change material 5 in the first and second embodiments is a flat face (FIG. 2, FIG. 3), the face is not limited thereto but may be formed in a fin shape, for example. This makes it possible to expand the contact area between the first solid-liquid phase change material 5 and the heat storage container 6, so that the thermal conductivity can be improved.

Further, while the part forming each of the small spaces of the heat storage container 6 in the first and second embodiments is formed in a rectangular shape when viewed from the depth direction, the shape thereof is not limited thereto. As an example, the part forming each of the small spaces of the heat storage container 6 may be formed in a triangular shape with the inner bottom face 22 of the casing 2 being the base when viewed from the depth direction. In this case, each of the small spaces is formed inside a triangular cylindrical body extended in the depth direction. As for the triangular cylindrical body, the bottom face in the outer wall surface 6b opposes and comes in surface contact with the inner bottom face 22 of the casing 2. As another example, the part forming each of the small spaces of the heat storage container 6 may be formed in a circular shape or an elliptic shape when viewed from the depth direction. In this case, each of the small spaces is formed inside a circular cylindrical body or an elliptical cylindrical body extended in the depth direction. As for the circular cylindrical body or the elliptical cylindrical body, the face in the outer wall surface 6b opposing to the inner bottom face 22 of the casing 2 is formed to be flat and to come in surface contact with the inner bottom face 22.

Further, while the small space of the heat storage container 6 is formed in a cuboid shape, the shape thereof is not limited thereto but may be formed in a cubic shape. In this case, a plurality of small spaces are arranged in the depth direction and the width direction, respectively. Further, while the internal space 6a of the heat storage container 6 is divided into the small spaces by the inner walls 6c, the configuration thereof is not limited thereto but the internal space 6a may not be divided into small spaces by the inner walls 6c.

Further, while the battery cells 3 are described to be cylindrical lithium ion batteries in the first and second embodiments, the batteries are not limited thereto but may be quadrangular-prism batteries, for example, or may be batteries other than the lithium ion batteries.

The vehicle battery pack according to the present embodiment provides such an effect that it is possible to effectively cool the battery cells even when the difference in the outside temperatures is great.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle battery pack, comprising:
    at least one battery cell;
    a casing that has a heat dissipation property for discharging heat outside the casing and houses the battery cell in a housing space;
    a first solid-liquid phase change material that directly comes in contact with the battery cell and fills the housing space;
    a second solid-liquid phase change material that has a heat storage property and has a second phase change temperature higher than a first phase change temperature of the first solid-liquid phase change material; and
    a heat storage container that has thermal conductivity and has an internal space filled with the second solid-liquid phase change material, wherein
    the heat storage container is housed is the housing space of the casing, and has an outer wall surface that comes in contact with an inner wall surface of the casing.

2. The vehicle battery pack according to claim 1, further comprising:
    a thermal conductive member including a contact part that comes in contact with at least an outer surface of the battery cell, wherein
    the thermal conductive member has an extended part extended from the contact part toward a vertical direction, the extended part coming in contact with the inner wall surface of the casing.

3. The vehicle battery pack according to claim 2, wherein
    the heat storage container comes in surface contact with, in the inner wall surface of the casing, at least one of an inner top face and an inner bottom face opposing to each other in a vertical direction.

4. The vehicle battery pack according to claim 3, wherein
    the first phase change temperature of the first solid-liquid phase change material and the second phase change temperature of the second solid-liquid phase change material have the following relations:
    the first phase change temperature < a set outside temperature; and the second phase change temperature > the set outside temperature.

5. The vehicle battery pack according to claim 2, wherein
    the first phase change temperature of the first solid-liquid phase change material and the second phase change temperature of the second solid-liquid phase change material have the following relations:
    the first phase change temperature < a set outside temperature; and the second phase change temperature > the set outside temperature.

6. The vehicle battery pack according to claim 1, further comprising:
    a thermal conductive member including a contact part that comes in contact with at least an outer surface of the battery cell, wherein
    the thermal conductive member has an extended part extended from the contact part toward a vertical direction, the extended part coming in contact with the outer wall surface of the heat storage container.

7. The vehicle battery pack according to claim 6, wherein
    the heat storage container comes in surface contact with, in the inner wall surface of the casing, at least one of an inner top face and an inner bottom face opposing to each other in a vertical direction.

8. The vehicle battery pack according to claim 7, wherein
    the first phase change temperature of the first solid-liquid phase change material and the second phase change temperature of the second solid-liquid phase change material have the following relations:
    the first phase change temperature < a set outside temperature; and the second phase change temperature > the set outside temperature.

9. The vehicle battery pack according to claim 6, wherein
    the first phase change temperature of the first solid-liquid phase change material and the second phase change temperature of the second solid-liquid phase change material have the following relations:

the first phase change temperature < a set outside temperature; and the second phase change temperature > the set outside temperature.

10. The vehicle battery pack according to claim 1, wherein
the heat storage container comes in surface contact with, in the inner wall surface of the casing, at least one of an inner top face and an inner bottom face opposing to each other in a vertical direction.

11. The vehicle battery pack according to claim 10, wherein
the first phase change temperature of the first solid-liquid phase change material and the second phase change temperature of the second solid-liquid phase change material have the following relations:
the first phase change temperature < a set outside temperature; and the second phase change temperature > the set outside temperature.

12. The vehicle battery pack according to claim 1, wherein
the first phase change temperature of the first solid-liquid phase change material and the second phase change temperature of the second solid-liquid phase change material have the following relations:
the first phase change temperature < a set outside temperature; and the second phase change temperature > the set outside temperature.

\* \* \* \* \*